3,401,009
EXTRACTION OF ALUMINA FROM BAUXITE
Allen Joseph Gittos, Brisbane, Queensland, Australia, assignor, by mesne assignments, to Commonwealth Aluminium Corporation Limited, Melbourne, Victoria, Australia, a company of Australia
No Drawing. Filed July 6, 1964, Ser. No. 380,644
Claims priority, application Australia, July 29, 1963, 33,510/63
7 Claims. (Cl. 23—52)

ABSTRACT OF THE DISCLOSURE

Improved Bayer process for extraction of high silica bauxite containing alumina as monohydrate and trihydrate and substantial amounts of silica as quartz involving rapid, high-temperature pressure digestion with dilute alkali liquor around 100 g./l. $Na_2O$ and pregnant liquor ratios between 1.06 to 1.12 $Al_2O_3/Na_2O$ as defined to reduce loss of caustic values by inhibition of alkali quartz attack in an optimum reaction time of around 15 minutes.

---

This invention realtes to improvements in the extraction of alumina by the alkaline (Bayer) process from bauxite containing quartz.

The invention relates particularly to improvements in the extraction of bauxites containing:

(a) Alumina either wholly or partially in the monohydrated (Boehmite) form, and
 (b) Silica either wholly or partially in form of the mineral quartz.

The present invention is particularly concerned with the control of the digestion stage of the alkaline extraction process especially when applied to extraction of Australian bauxite from the North Queensland area in which:

(a) The alumina is present as a mixture of the monohydrated and trihydrated forms,
 (b) The silica is present as a mixture of silica in combined form as clay bodies and silica in the form of the mineral quartz.

This invention has for an object the extraction of a maximum proportion of the total available alumina wholly or partially in the monohydrated form from the above types of bauxite by controlling the digestion process in such a manner that the loses of alkali due to the presence of quartz are reduced to a minimum.

It has been found that in the exrtaction of alumina at elevated temperatures by the wet alkaline process from bauxites which contain alumina either wholly or partially in the form of monohydrate and silica as a mixture of silica present partly in the form of silica combined with alumina in the form of clay bodies and partly in the form of mineral quartz, the alkali losses due to combination of caustic soda with the quartz are minimized by limiting the time during which the bauxite is digested with caustic soda substantially to the time necessary to dissolve and then repreciptate, as disilication product, all of the readily attacked reactive silica.

The invention generally comprises a process for the rapid wet-alkali aluminate extraction of bauxite ore containing alumina partly in the monohydrated form and partly in the trihydrated form and wherein a substantial amount of the silica content of the ore is present in the form of quartz and partly bonded with alumina, and wherein the ore is digested with alkali liquor under pressure and at elevated temperatures characterized in that loss of sodium hydroxide due to reaction with silica as quartz is reduced by digesting the ore for a period of from 10 to 20 minutes at a temperature of from about 220° C. to 250° C. with alkali liquor containing 80 to 140 g./l. $Na_2O$ to rapidly dissolve substantially all of the total available alumina and combined silica to form a pregnant liquor containing sodium aluminate but until only a minor proportion of the quartz content of the ore has dissolved and disolving and re-precipitating readily reactive silica from the ore as desilication product while maintaining in the pregnant liquor during digestion a ratio of alumina to free soda expressed as g./l. $Na_2O$ of from about 1.06 to about 1.12.

When conducting the digestion process of the present invention it has been found that for optimum results the temperature should be controlled in region of 240° C. when extracting bauxites containing alumina either wholly or partially in the form of monohydrate and silica as a mixture of silica present partly in the form of silica combined with alumina in the form of clay bodies and partly in the form of mineral quartz. Also the digestion time should be limited within the range of from 10 to 20 minutes, with a preferred digestion time of 15 minutes in order to reduce alkali loses due to combination of caustic soda with quartz due to attack on quartz, to a value which is approximately equal to 30% of the quartz content of the bauxite undergoing digestion. This limit of quartz attack can be achieved by using alkali concentrations within the range of 80 to 140 grams per liter of free soda as $Na_2O$ based on free caustic soda and as soda combined as sodium aluminate. The preferred concentration of alkali for the digestion is that which is equivalent to 100 g.p.l. free soda. Under these conditions we found that approximately 90% or higher of the total available alumina was extracted from the particular bauxite under test.

In addition to the above described conditions which are required for reducing the degree of quartz attack and yet are capable of extracting a high proportion of the available alumnia, it has been found that it is desirable to maintain the ratio of alumina to free soda in the pregnant liquor within the range of 1.06 to 1.12. It is preferred to maintain a pregnant liquor ratio of 1.08 in the digester in conjunction with a digestion temperature of 240° C. and digestion time of 15 minutes. Under these conditions the silica remaining in solution in the effluent liquor can be restricted to approximately 0.5 g.p.l. $SiO_2$.

The following definitions apply to terms used in this specification:

Reactive Silica ($SiO_2$)

Reactive silica is the silica present in the bauxite in the combined form as clay bodies and/or other silicates.

Quartz ($SiO_2$)

Quartz is silica present in the bauxite as crystallized silicon dioxide existing free and uncombined.

Total alumina ($Al_2O_3$)

The total alumina is the alumina content of the bauxite as determined by chemical analysis and is the alumina present in any form including the hydrated alumina whether present as trihydrate or monohydrate and the alumina present combined with silica as clay bodies.

Total available alumina ($Al_2O_3$)

The total available alumina in the bauxite consists of the total alumina reduced by the stoichiometric equivalent of the reactive silica to allow for the formation of sodium aluminium silicate during processing. For the purpose of calculating total available alumina it is assumed that the desilication product sodium aluminium silicate is of the formula $2Na_2O, 2Al_2O_3, 3SiO_2$.

Free soda

By free soda, which is expressed in terms of grams per liter $Na_2O$, is meant the soda existing in solution as free caustic soda and as soda combined with alumina in the compound sodium aluminate, but excluding soda combined as carbonate and as other salts.

Liquor ratio

The pregnant liquor ratio is the ratio of alumina to free soda in the pregnant liquor. The liquor ratio is expressed in the following manner:

$$R = \frac{\text{g.p.l. alumina as } Al_2O_3}{\text{g.p.l. free soda as } Na_2O}$$

Although the process is particularly suitable for the extraction of alumina from North Queensland bauxites, it is also applicable to the treatment of bauxites of similar composition and properties obtained from other localities.

The North Queensland bauxites referred to in this specification are typified by the following range of chemical composition:

| | Percent |
|---|---|
| Alumina ($Al_2O_3$) | 52–60 |
| Silica ($SiO_2$) | |
|     Combined as clay bodies | 1.5–5.0 |
|     Free as the mineral quartz | 0.5–3.0 |
| Iron oxide ($Fe_2O_3$) | 5.0–20.0 |
| Titania ($TiO_2$) | 2.5–3.0 |
| Water ($H_2O$) chemically combined | 23.0–30.0 |

If bauxite of average chemical composition from the above range is treated by the Bayer process under conditions in which only the trihydrated portion of the alumina would be extracted, the percentage of extractable alumina would be between 42 and 43% by weight of the bauxite which amounts to between 75 and 77% of the total alumina present.

It is obvious that for economic reasons it is desirable to extract as high a percentage as possible of the total available alumina, i.e., both the monohydrate and trihydrate.

It is well known that the economics of the Bayer process are greatly affected by the losses of alkali due to the combination of caustic soda with silica in the bauxite.

It is also well known that the silica present in the bauxite combined as clay bodies combines readily with caustic soda, and alkali losses due to this form of silica are unavoidable.

It has been found, however, that silica present in the bauxite as the mineral quartz is not always as readily attacked by alkali as the combined silica.

More particularly, test work carried out on the treatment of North Queensland bauxite by the Bayer process has shown that:

(a) The alumina is readily soluble, and practically full extraction of the available alumina present can be achieved in short digestion times, in the region of 10 to 20 minutes.

(b) That the extent to which the quartz is attacked by caustic soda at elevated temperatures depends on the time of digestion, (c) That the extent to which quartz is attacked is also dependent upon the temperature of digestion, and that adequate desilication can be achieved in relatively short digestion times at elevated temperatures, preferably between 220° and 250° C.

The pressures used in the digestion of the ores are essentially saturated steam pressures. The improved process according to the present invention is more fully described by referring to the following example and to the table which illustrates the advantages described above.

EXAMPLE

Five series of tests were conducted on a bauxite of the following analysis:

| | Percent |
|---|---|
| $Al_2O_3$ | 59.4 |
| Total available $Al_2O_3$ | 56.4 |
| Reactive $SiO_2$ | 2.64 |
| Quartz | 1.64 |

The bauxite samples were treated with caustic soda solution in a small stainless steel autoclave fitted with a thermometer well and rotated slowly over a gas flame. In each test a heating-up time of 15 to 25 minutes was required, and timing was begun from the moment when the predetermined extraction temperature was reached. Close temperature control was obtained and variations throughout a test did not exceed 2° C.

Rapid cooling of the autoclave and its contents to below 100° C. was effected by immediate imersion in a tank of flowing cold water at the end of each test. The slurry was filtered and washed with dilute caustic solution and with water.

Analyses performed on the original bauxite and the red mud produced in each test were used to calculate the extraction figures quoted. The level of silica in the liquor was determined by analysis of a liquor sample.

The extraction conditions used in these tests and the results obtained are set out in the table.

TABLE

| | Extraction conditions | | | | | Results | | | | |
|---|---|---|---|---|---|---|---|---|---|---|
| Test No. | Free soda (g.p.l.) | $SiO_2$ in liquor (g.p.l.) | Temp., (° C.) | Time (min.) | Percent alumina extracted | Percent total avail. $Al_2O_3$ recovered | Pregnant liquor ratio | Quartz attacked (percent to total) | Soda usage (ton NaOH/ ton $Al_2O_3$ ext.) | $SiO_2$ in pregnant liquor (g.p.l.) |
| 1 | 270 | 0.53 | 180 | 15 | 50.00 | 88.6 | 0.99 | 5.5 | 0 049 | 3.59 |
| 2 | | | | 30 | 5.06 | 90.5 | 0.99 | 15.9 | 0.051 | 3.22 |
| 3 | | | | 60 | 50.96 | 90.3 | 0.99 | 17.1 | 0.051 | 3.27 |
| 4 | | | | 90 | 52.26 | 92.6 | 1.00 | 29.3 | 0.053 | 3.39 |
| 5 | 218 | 0.53 | 200 | 15 | 51.68 | 91.6 | 0.99 | 18.9 | 0.051 | 2.06 |
| 6 | | | | 30 | 53.15 | 94.2 | 1.01 | 22.0 | 0.050 | 2.18 |
| 7 | | | | 60 | 53.25 | 94.4 | 1.02 | 34.8 | 0.054 | 2.24 |
| 8 | | | | 90 | 53.79 | 95.4 | 1.01 | 47.6 | 0.057 | 2.26 |
| 9 | 157 | 0.53 | 220 | 15 | 53.36 | 94.6 | 1.03 | 20.1 | 0.049 | 1.30 |
| 10 | | | | 30 | 54.51 | 96.6 | 1.05 | 36.6 | 0.053 | 1.33 |
| 11 | | | | 60 | 54.82 | 97.2 | 1.05 | 39.0 | 0.053 | 1.17 |
| 12 | | | | 90 | 54.84 | 97.2 | 1.04 | 71.4 | 0.062 | 1.23 |
| 13 | 127 | 0.53 | 230 | 15 | 54.34 | 96.3 | 1.07 | 31.1 | 0.052 | 0.84 |
| 14 | | | | 30 | 54.49 | 96.6 | 10.5 | 40.9 | 0.054 | 40.1 |
| 15 | | | | 60 | 54.76 | 97.1 | 1.06 | 65.2 | 0.061 | 0.83 |
| 16 | | | | 90 | 55.07 | 97.7 | 1.06 | 80.5 | 0.064 | 0.83 |
| 17 | 100.0 | 0.53 | 240 | 15 | 55.73 | 98.8 | 1.08 | 26.8 | 0.050 | 0.52 |
| 18 | | | | 30 | 55.52 | 98.4 | 1.08 | 51.8 | 0.056 | 0.52 |
| 19 | | | | 60 | 55.60 | 98.5 | 1.08 | 74.4 | 0.062 | 0.46 |
| 20 | | | | 90 | 55.59 | 98.5 | 1.08 | 93.9 | 0.067 | 0.46 |

The five series of tests referred to in the example indicate that:

(a) Under given extraction conditions, virtually complete extraction of the alumina available under those conditions can be achieved in 10 to 20 minutes digestion time, (b) The attack on quartz progresses at a much slower reaction rate than the solution of alumina and in all series of tests the relationship between time and degree of quartz attack was apparent, (c) The rate of quartz solution is a function of temperature of digestion. However, even at 240° C. the percentage of quartz attacked was only 27% after 15 minutes digestion, (d) The rate of desilication of the pregnant liquors was strongly dependent upon temperature. At 240° C., desilication occurred so rapidly that the silica content of the extraction liquor remained unchanged after 15 minutes. Up to this time, the desilication reaction kept pace with the solution of quartz and thereafter the silica content gradually decreased despite the continued quartz attack.

At temperatures in the region of 240° C., e.g., 220° C. to 250° C., it was clear that adequate desilication of the liquors could be achieved in short digestion times.

I claim:

1. A process for the rapid wet-alkali aluminate extraction of bauxite ore containing alumina partly in the monohydrated form and partly in the trihydrated form and wherein a substantial amount of the silica content of the ore is present in the form of quartz and partially combined with alumina, and wherein the ore is digested with alkali liquor under pressure and at elevated temperatures characterized in that loss of sodium hydroxide due to reaction with silica as quartz is reduced by digesting the ore for a period of from 10 to 20 minutes at a temperature of from about 220° C. to 250° C. with alkali liquor containing 80 to 140 g.p.l. $Na_2O$ to rapidly dissolve substantially all of the total available alumina and combined silica to form a pregnant liquor containing sodium aluminate, but until only a minor proportion of the quartz content of the ore has disolved and dissolving and re-precipitating readily reactive silica from the ore as desilication product while maintaining in the pregnant liquor during digestion a ratio of alumina to free soda expressed as g.p.l. $Na_2O$ of from about 1.06 to about 1.12.

2. A process according to claim 1 wherein the alkali liquor contains about 100 g.p.l. free soda in the form of free caustic soda and as sodium aluminate.

3. A process according to claim 1 wherein the digestion time is about 15 minutes.

4. A process according to claim 1 wherein the temperature of the digestion is about 240° C.

5. A process according to claim 1 wherein the ratio of alumina to free soda in the pregnant liquor is maintained at about 1.08.

6. A process according to claim 1 wherein the digestion time is about 15 minutes and the alkali liquor used for digestion contains about 100 g.p.l. of free soda in the form of free caustic soda and as sodium aluminate, and the temperature of the digestion is about 240° C.

7. A process according to claim 1 wherein the digestion time is about 15 minutes and the temperature of the digestion is about 240° C. while maintaining a ratio of alumina to free soda, as g.p.l. of $Na_2O$, of about 1.08 in the pregnant liquor during the digestion process.

References Cited

UNITED STATES PATENTS

| | | | |
|---|---|---|---|
| 2,375,343 | 5/1945 | Brown | 23—52 X |
| 2,946,658 | 7/1960 | Donaldson | 23—143 |

OSCAR R. VERTIZ, *Primary Examiner.*

G. T. OZAKI, *Assistant Examiner.*